United States Patent Office 2,700,002
Patented Jan. 18, 1955

2,700,002

PROCESS OF TREATING SODIUM CHLORIDE TO RENDER IT MOISTURE RESISTANT

John Strong, Baltimore, Md., assignor to the United States of America as represented by the Secretary of the Navy No Drawing. Application February 13, 1950,
Serial No. 144,030

2 Claims. (Cl. 117—61)

This invention relates to a process of treating hygroscopic compounds to render them resistant to moisture.

For many uses certain salts such as sodium chloride have important uses in the arts, as for example, in the detection and measurement of infrared radiations. In prior methods to reduce the effect of water on these salts, use has been made of coatings such as oils, rosin, tar, fats, wax, and the like; but these coatings while inhibiting hygroscopic action, materially lessened or destroyed the transparency of the salt for infrared radiation.

The object of the present invention therefore, is to provide an improved coating material for an infrared transparent salt such as sodium chloride which will prevent water absorption by the salt. A further object is to provide a non-hygroscopic coating for infrared-transparent salts which will not affect adversely the original infrared transparency while preventing absorption of moisture by the salt, that is to say the salt is made moisture proof.

The above objects of the invention are accomplished by coating the salt element, which may be in the form of a plate for utilization in optical equipment such as a bolometer, with a thin layer of silver chloride. It has been determined that when applied in the method now to be described silver chloride performs the two functions of passing infrared radiation and protecting the salt from water absorption.

In accordance with my invention the salt is placed in a closed chamber from which air has been evacuated to a pressure preferably about 0.1 micron of mercury, and heated to a temperature of around 400° C. Then silver chloride is vaporized and applied in the chamber to the salt forming a deposit thereon of the desired thickness. The resulting coated product is then cooled to room temperature.

It is important to note that both the silver chloride and sodium chloride form solid solutions with each other at the specified elevated temperature and hence there results an intimate bond between the two substances. Also, although the salt may be granular or in particle form preferably it should be shaped as an integral mass such as a plate with a smooth surface for reception of the coating.

Any of the known methods for evacuating the chamber and heating the same may be used, as that for example, shown in my book "Procedures in Experimental Physics." By such methods the silver chloride is vaporized and the chamber containing the sodium chloride heated in preparation for application of the silver chloride vapor.

While sodium chloride has been specified as the salt to be coated, obviously other hygroscopic or deliquesent salts may be so coated, although the special utility of the coating is in conjunction with apparatus requiring infrared transparency in the salt used. Hence, it should be understood that the foregoing disclosure relates to a preferred embodiment of the invention and modifications may be made without departing from the spirit and scope of the invention as set forth in the appended claims.

What is claimed is:

1. The process of treating sodium chloride to prevent water absorption therein without disturbance of the infrared transparency thereof which comprises heating the sodium chloride in an evacuated chamber to about 400° C., subjecting the sodium chloride to the vapor of silver chloride to form a coating of silver chloride on said sodium chloride, and finally cooling the coated sodium chloride to room temperature.

2. A process as defined in claim 1 wherein said chamber is evacuated to a pressure of about 0.1 micron.

References Cited in the file of this patent

UNITED STATES PATENTS

| Number | Name | Date |
|---|---|---|
| 1,362,087 | Dietz | Dec. 14, 1920 |
| 2,056,540 | Segura | Oct. 6, 1936 |
| 2,301,456 | Sabine | Nov. 10, 1942 |
| 2,435,435 | Fonda | Feb. 3, 1948 |
| 2,448,511 | Barnes | Sept. 7, 1948 |
| 2,500,770 | Pierce | Mar. 14, 1950 |
| 2,512,257 | Pfund | June 20, 1950 |
| 2,561,077 | Tilton | July 17, 1951 |